(12) United States Patent
Odaohhara

(10) Patent No.: US 8,125,190 B2
(45) Date of Patent: Feb. 28, 2012

(54) BATTERY CHARGING SYSTEM

(75) Inventor: Shigefumi Odaohhara, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 960 days.

(21) Appl. No.: 12/119,721

(22) Filed: May 13, 2008

(65) Prior Publication Data

US 2009/0001935 A1    Jan. 1, 2009

(30) Foreign Application Priority Data

Jun. 27, 2007 (JP) ................................. 2007-169013

(51) Int. Cl.
*H02J 7/00* (2006.01)
(52) U.S. Cl. ........ 320/134; 320/112; 320/114; 320/135; 320/136; 361/91.1
(58) Field of Classification Search .................. 320/112, 320/114, 134–136; 361/91.1; 323/268–272
See application file for complete search history.

(56) References Cited

U.S. PATENT DOCUMENTS

| | | | |
|---|---|---|---|
| 6,184,660 B1 * | 2/2001 | Hatular | 320/141 |
| 6,992,463 B2 * | 1/2006 | Yoshio | 320/134 |
| 2007/0216366 A1 * | 9/2007 | Inamine et al. | 320/132 |

FOREIGN PATENT DOCUMENTS

| | | | |
|---|---|---|---|
| JP | 04207909 A | * | 7/1992 |
| JP | 07-274404 | | 10/1995 |
| JP | 09-130988 | | 5/1997 |
| JP | 09-149556 | | 6/1997 |
| JP | 11-098714 | | 4/1999 |
| JP | 2002-233071 | | 8/2002 |

* cited by examiner

*Primary Examiner* — Samuel Berhanu
(74) *Attorney, Agent, or Firm* — Antony P. Ng; Yudell Isidore Ng Russell PLLC

(57) ABSTRACT

A battery charging system is disclosed. The battery charging system includes a battery cell, a voltage measurement circuit and an overvoltage protection circuit. The voltage measurement circuit measures a cell voltage of the battery cell. The overvoltage protection circuit is configured to stop charging the battery cell when a reading voltage measured by the voltage measurement circuit reaches an overvoltage setting value. The battery charging system also includes a battery charger for charging the battery cell, and a control unit for supplying a control voltage to the battery charger to perform feedback control of an output voltage of the battery charger. The battery charger includes a voltage feedback input for receiving a feedback voltage and a setting value input for receiving a setting voltage. The control voltage is generated based on the reading voltage and the setting voltage.

9 Claims, 7 Drawing Sheets

| No. | READING ERROR ε1 (V) | OUTPUT ERROR ε2 (V) | SETTING VOLTAGE | | | | | | | | | | | | | | | | | | | |
|---|---|---|---|---|---|---|---|---|---|---|---|---|---|---|---|---|---|---|---|---|---|---|
| #1 | −0.03 | +0.03 | 4.200 | 4.220 | 4.230 | 4.220 | 4.210 | 4.240 | 4.200 | 4.170 | 4.160 | 4.150 | 4.180 | 4.170 | 4.230 | 4.220 | 4.210 | 4.200 | 4.190 | 4.170 | 4.180 | 4.190 | 4.200 | 4.180 |
| | +0.03 | −0.03 | 4.200 | | | | | | | | | | | | | | | | | | | | |
| | −0.03 | −0.03 | 4.200 | 4.220 | | | | | | | | | | | | | | | | | | | |
| | +0.03 | +0.03 | 4.200 | 4.220 | | | | | | | | | | | | | | | | | | | |

Fig. 5

BATTERY CHARGING SYSTEM

PRIORITY CLAIM

The present application claims benefit of priority under 35 U.S.C. §§120, 365 to the previously filed Japanese Patent Application No. JP2007-169013 entitled, "Charging system, electronic device, and charging method" with a priority date of Jun. 27, 2007, which is incorporated by reference herein.

BACKGROUND OF THE INVENTION

1. Technical Field

The present invention relates to charging systems in general, and in particular to a charging system that can maintain a high-setting voltage of a battery charger while maintaining a low-setting value of an overvoltage protection circuit with respect to a battery cell.

2. Description of Related Art

Most rechargeable batteries for portable computers take the form of a battery pack having multiple battery cells composed of a lithium ion rechargeable battery with a high-energy density. Upon charging/discharging the lithium ion rechargeable battery, it is necessary to precisely control charging/discharging current and voltage. In particular, it is necessary to strictly control the charging voltage in a constant-voltage control period. Therefore, a processor is usually provided within a battery pack having lithium ion rechargeable batteries. The battery pack generally employs a smart battery in which a processor monitors an internal state of the battery pack during charging and discharging in order to send information to a portable computer or to activate a protection circuit. The smart battery is a battery device that is compliant with the standards called smart battery system (SBS) initiated by Duracell Inc. and Intel Inc. A battery pack compliant with the SBS standard is also called an intelligent battery.

In an intelligent battery, an electric circuit portion having a processor, a current measurement circuit, a voltage measurement circuit, a temperature sensor, and a rechargeable battery, all mounted on a substrate contained within a housing. The processor is operable to communicate with an embedded controller of the portable computer via data lines. A protection circuit is also installed in the intelligent battery; therefore, when an abnormality has occurred in the cell during use, the protection circuit can be operated to stop charging/discharging operations. As items for estimating the abnormality to be detected by the intelligent battery, information such as current, voltage, temperature, and voltage balance between the battery cells during charging/discharging are included.

In an existing charging system for an intelligent battery, the battery pack and the portable computer include a respective voltage measurement circuit. A measurement value of the voltage measurement circuit incorporated in the battery pack is used to stop charging when the voltage of the battery cell exceeds a predetermined value during the charging process. The voltage measurement circuit incorporated in the portable computer measures an output voltage of the battery charger, and the measurement value is used for feedback control of the battery charger.

When the output voltage of the battery charger has an output error from a setting voltage, a reading voltage of the voltage measurement circuit of the battery pack also has a measurement error. Moreover, since resistive elements such as wirings, terminals or circuit elements are present between the output of the battery charger and the battery cell, the output voltage is not identical to the cell voltage, and the difference varies with charging current. In addition, in the charging system, there are some cases where the cell voltage changes abruptly with a change in ambient temperature or drift of the battery charger. When charging is normally performed on the battery cell, it is necessary to provide a sufficient margin between the setting value of the battery charger and an overvoltage setting value of the overvoltage protection circuit so that the overvoltage protection circuit of the battery pack does not malfunction.

In the past, in order to prevent malfunctioning of the overvoltage protection circuit, a gap is provided between the setting voltage and the overvoltage setting value so that an upper limit of the output voltage that varies with an output voltage error of the battery charger from the setting voltage does not overlap with a lower limit of the cell voltage measured by the voltage measurement circuit with a measurement error. For example, if the voltage measurement circuit has a reading error of ±0.05 V, the overvoltage protection circuit operating at an overvoltage setting voltage will be operated with the same error with respect to the cell voltage. Therefore, if the overvoltage setting voltage is 4.35 V, the minimum value of operation will be 4.30 V while a guaranteed value of the overvoltage protection circuit will be 4.40 V. In addition, when the battery charger has an output error of ±0.03 V, for example, and the setting voltage is 4.20 V, the upper limit of the output voltage will be 4.23 V. Therefore, a margin of 0.07 V can be provided between the lowest operating voltage (4.30 V) of the overvoltage protection circuit and the maximum output voltage (4.23 V), and thus the overvoltage protection circuit is prevented from malfunctioning during the charging process.

In recent years, lithium ion rechargeable batteries are demanded to provide a higher safety level. For this reason, related business groups are moving to further tighten the safety standards of the lithium ion rechargeable batteries. Specifically, in the past, the standard guaranteed value of the overvoltage protection circuit was 4.40 V; however, the standard is now under consideration for revising it to 4.25 V. Even when the corrected value of the overvoltage protection circuit is changed to 4.25 V, it is necessary to set the battery charger so that malfunctioning of the overvoltage protection circuit is prevented as long as the cell voltage is in a normal range.

In this case, the decreased guaranteed value can be dealt with by decreasing the overvoltage setting value and the setting voltage by the decreased amount (0.15 V). However, when the setting voltage of the battery charger is decreased, the full charge capacity is also decreased or the time to reach the full charge capacity is increased, which is not desirable. Even when the voltage measurement circuit used in the feedback control of the battery charger is corrected with the cell voltage received from the battery pack, it is impossible to completely absorb the output error of the battery charger. Moreover, it is necessary to provide a considerable gap between the overvoltage setting voltage and the setting voltage in order to deal with a change in the cell voltage resulting from drift of the battery charger, the resistive elements between the battery charger and the battery cell, and a change in ambient temperature. Therefore, it is difficult to set the setting voltage of the battery charger to the same level (4.20 V) as the case when the corrected value was 4.40 V.

Consequently, it would be desirable to provide a charging system that can maintain a high-setting voltage of a battery charger while maintaining a low-setting value of an overvoltage protection circuit with respect to a battery cell.

SUMMARY OF THE INVENTION

In accordance with a preferred embodiment of the present invention, a battery charging system includes a battery cell, a voltage measurement circuit and an overvoltage protection circuit. The voltage measurement circuit measures a cell voltage of the battery cell. The overvoltage protection circuit is configured to stop charging the battery cell when a reading voltage measured by the voltage measurement circuit reaches an overvoltage setting value. The battery charging system further includes a battery charger for charging the battery cell, and a control unit for supplying a control voltage to the battery charger to perform feedback control of an output voltage of the battery charger. The battery charger includes a voltage feedback input for receiving a feedback voltage and a setting value input for receiving a setting voltage. The control voltage is generated based on the reading voltage and the setting voltage.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 is a chart for explaining the operation of a voltage feedback control system of the charging system shown from FIG. 3;

DETAILED DESCRIPTION OF A PREFERRED EMBODIMENT

Figure 1:
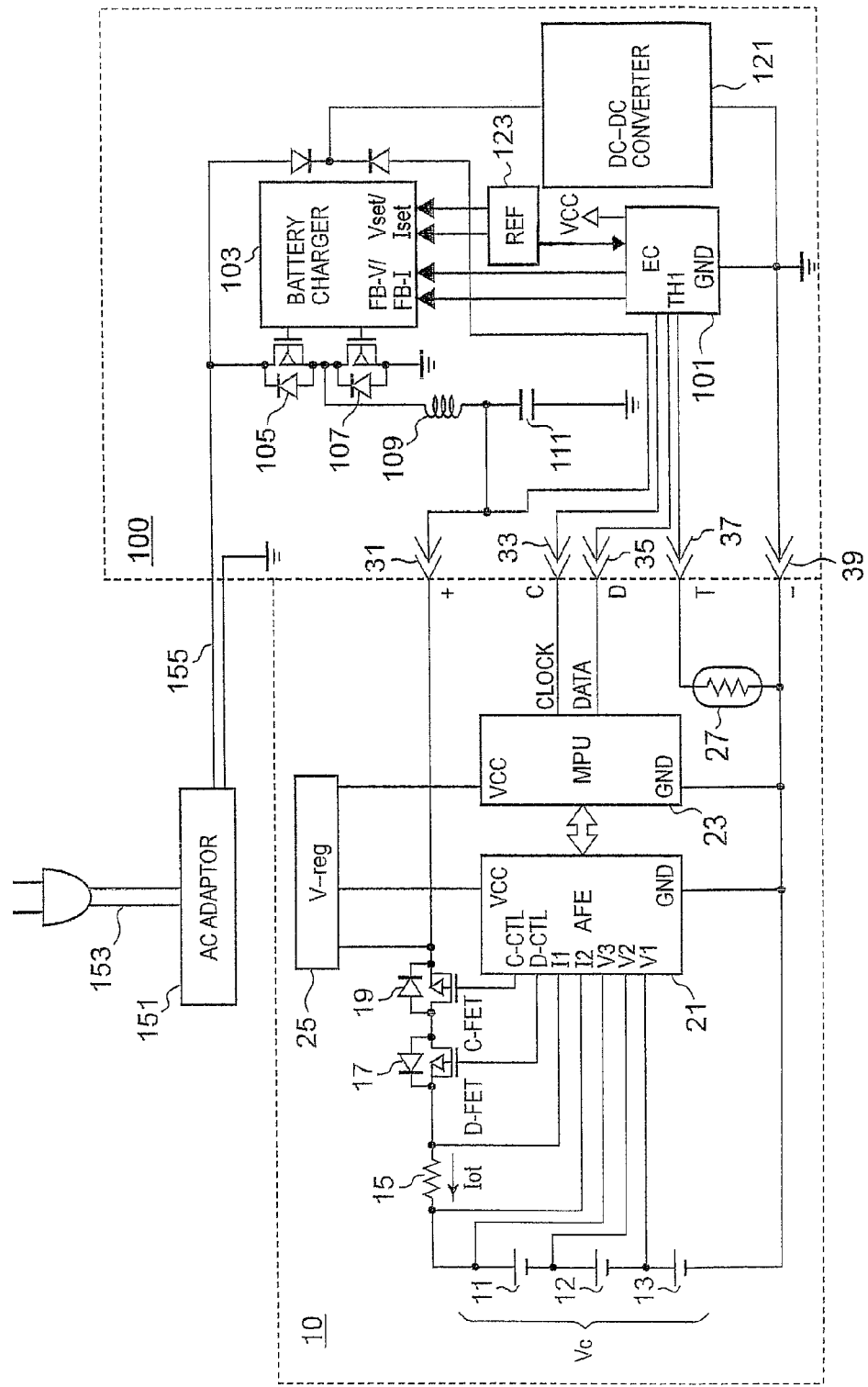
FIG. 1 is a schematic diagram of a charging system having a battery pack, in accordance with a preferred embodiment of the present invention.

With reference now to the drawings, and in particular to FIG. 1, there is depicted a schematic diagram of a charging system having a battery pack 10 in compliance with the smart battery system (SBS) standards along with a portable computer 100, in accordance with a preferred embodiment of the present invention. In addition to three, serially connected battery cells 11 to 13 of lithium ion rechargeable batteries, the battery pack 10 has installed therein many electronic components including a sensor resistor 15, a discharging FET 17, a charging FET 19, an analog front end (AFE) 21, a microprocessor unit (MPU) 23, a voltage regulator 25, and a thermistor 27. The battery pack 10 is connected to the portable computer 100 via five terminals of a positive (+) terminal 31, a C terminal 33, a D terminal 35, a T terminal 37, and a negative (−) terminal 39. A discharging current from the battery cells 11 to 13 and a charging current to the battery cells 11 to 13 flow between the battery cells 11 to 13 and the portable computer 100 via the positive (+) terminal 31 and the negative (−) terminal 39. The C terminal 33 and the D terminal 35 are connected to a clock terminal and a data terminal of the MPU 23, respectively, and the T terminal 37 is connected to the thermistor 27, which is for measuring temperature around the cells 11.

The AFE 21 and the MPU 23 are integrated circuits that are operated by a constant voltage supplied from the voltage regulator 25. Data are exchanged between the AFE 21 and the MPU 23. The AFE 21 includes analog input terminals V1, V2, and V3 for acquiring the respective potential difference of the battery cells 11 to 13 and analog input terminals I1 and I2 for acquiring potential difference across the sensor resistor 15. The AFE 21 also includes analog output terminals D-CTL and C-CTL for outputting signals that control on/off of the discharging FET 17 and the charging FET 19. The AFE 21 also includes a voltage measurement circuit and current measurement circuit. The f voltage measurement circuit measures the respective voltages of the battery cells 11 to 13, converts the measurement values into digital values, and delivers the converted values to the MPU 23. The MPU 23 calculates the sum of the respective voltages of the battery cells 11 to 13 to thereby calculate a reading voltage. Since the voltage measurement circuit has a measurement error, the reading voltage has a value different from an actual cell voltage Vc of the whole battery cells, detailed description of which will be provided later.

The current measurement circuit measures the charging current and the discharging voltage flowing in the battery cells 11 to 13 from the voltage detected by the sensor resistor 15, converts the measurement values into digital values, and delivers the converted values to the MPU 23. The MPU 23 is an integrated circuit in which in addition to an 8 to 16 bit CPU, a RAM, a ROM, a flash memory, and a timer are integrated into one package. The MPU 23 is provided with a voltage protection unit and a current protection unit, and monitors the state of the battery pack during charging/discharging based on the voltage and current values delivered from the AFE 21. When an abnormality is detected, the MPU 23 turns off the discharging FET 17 and the charging FET 19 via the AFE 21 to thereby stop the charging or discharging. The voltage protection unit and the current protection unit are constructed by a program that is executed by the MPU 23. The AFE 21 and the MPU 23 may be constructed by a single integrated circuit.

A clock line and a data line from the MPU 23 are connected to an embedded controller (EC) 101 at the portable computer 100 side via the C terminal 33 and the D terminal 35, respectively, so that the MPU 23 can communicate with the EC 101. The MPU 23 sends a control command such as a charging start command or a charging stop command to the EC 101 via the data line. Then, the EC 101 processes the control command to thereby start or stop the charging to the battery cells 11 to 13. Moreover, the MPU 23 periodically transmits the values of the reading voltage of the battery cells 11 to 13 and the charging current Iot flowing in the battery cells 11 to 13 to the EC 101 via the clock line and the data line at an interval of about 1 to about 2 seconds. The EC 101 detects a resistance value of the thermistor 27 that varies depending on the temperature around the battery cells 11 to 13 and notifies the MPU 23 of the detected resistance value. When there is an abnormality in the temperature, the MPU 23 turns off the discharging FET 17 and the charging FET 19 to thereby stop the charging or discharging.

The power management function of the portable computer 100 mainly includes the EC 101 and also includes a battery charger 103 and a DC-DC converter 121. The EC 101 is an integrated circuit that controls many hardware elements of the portable computer 100 as well as the power supply. The EC 101 can acquire information on a present current value and a present voltage value of the battery cells 11 to 13 through communication from the MPU 23. The EC 101 controls the battery charger 103 based on the control command of the charging start command and the charging stop command from the MPU 23 to thereby perform the charging to the battery cells 11 to 13.

The battery charger 103 includes a switching circuit composed of an FET 105 and an FET 107 and a smoothing circuit composed of an inductor 109 and a capacitor 111. The battery charger 103 suppresses the pulsation of the output current having passed through the switching circuit by using the smoothing circuit, converts a DC voltage input from an AC adaptor 151 into a DC voltage suitable for charging to the battery cells 11 to 13, and outputs them to the battery pack 10. The battery charger 103 charges the battery cells 11 to 13 by a constant-current/constant-voltage (CC-CV) method. To a current setting value input Iset and a voltage setting value input Vset of the battery charger 103, a voltage from a reference voltage source 123, which is divided from a constant voltage generated within the portable computer 100.

The AC adaptor 151 has a primary side thereof connected to a commercial power supply by an AC cord 153 and a secondary side thereof connected to the portable computer 100 by a DC cable 155. The DC-DC converter 121 converts the DC voltage input from the AC adaptor 151 or the DC voltage upon discharging from the battery cells 11 to 13 into a necessary voltage to thereby supply the necessary voltage to a system load (not shown) within the portable computer 100.

Although the battery charger 103 of the portable computer 100 is provided with the switching circuit composed of the FET 105 and the FET 107 and the smoothing circuit composed of the inductor 109 and the capacitor 111, the battery charger 103 is not provided with a conventional voltage-dividing resistor and a conventional sensor resistor for generating a feedback voltage and a feedback current to a voltage feedback input FB-V and a current feedback input FB-I. Instead of this, the analog signal output from the EC 101 is directly input to the voltage feedback input FB-V and the current feedback input FB-I of the battery charger 103.

The EC 101 converts the values of the feedback voltage and the feedback current acquired from the MPU 23 into analog values, delivers a feedback voltage to the voltage feedback input FB-V of the battery charger 103, and delivers a feedback current to the current feedback input FB-I. At that time, the EC 101 corrects the feedback voltage based on the reading voltage and the setting voltage to thereby deliver the corrected feedback voltage to the voltage feedback input FB-V of the battery charger, detailed description of which will be provided later. The battery charger 103 is operated at the feedback current input to the current feedback input FB-I in a constant-current manner during a constant-current control period, while the battery charger 103 is operated at the feedback voltage input to the voltage feedback input FB-V in a constant-voltage manner during a constant-voltage control period. In this construction, feedback control is performed during charging by using the reading voltage and the charging current lot detected within the battery pack 10.

Figure 2:
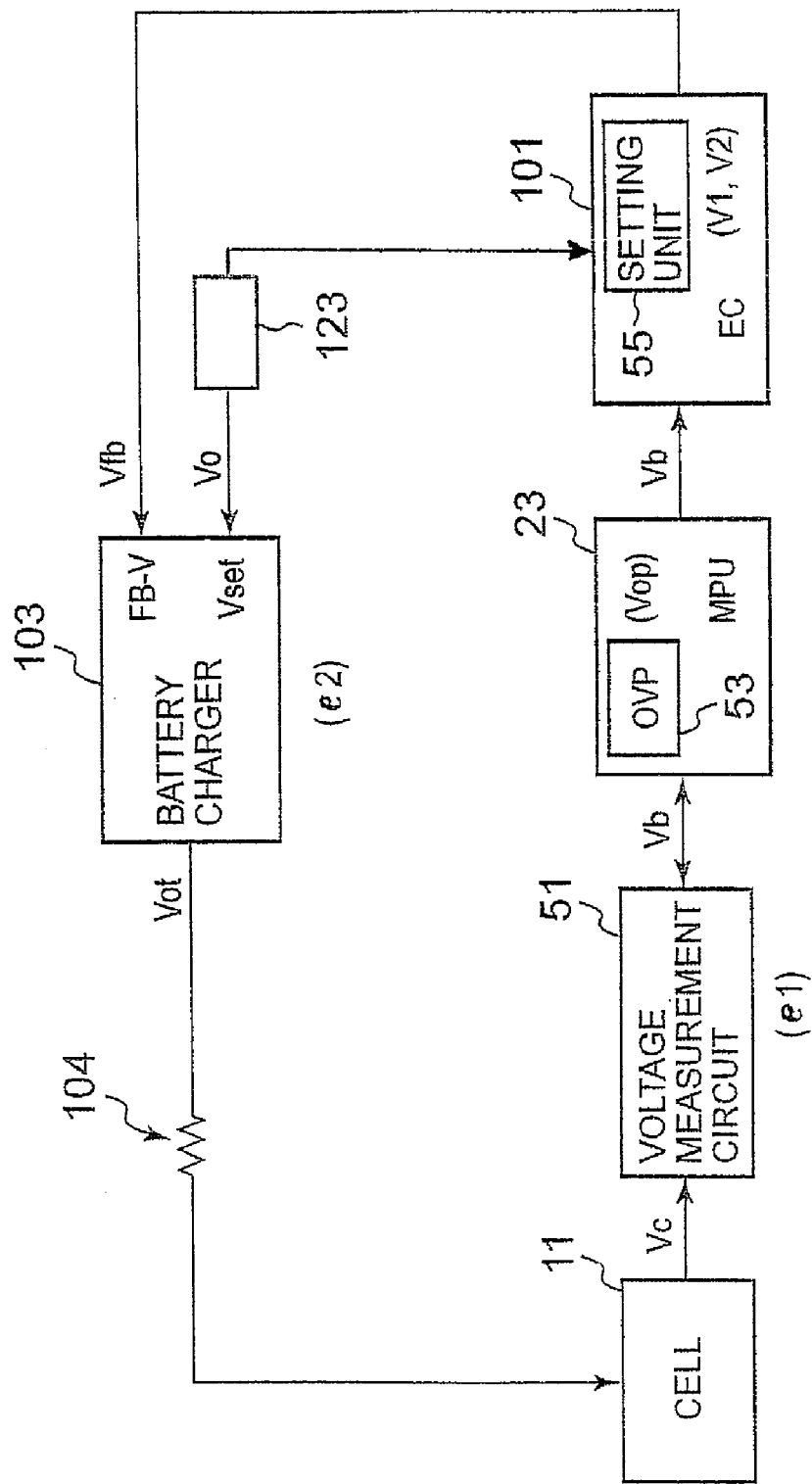
FIG. 2 is a block diagram of a voltage feedback system of the charging system from FIG. 1.

FIG. 2 is a block diagram for explaining in detail a voltage feedback system of the charging system of FIG. 1. In FIG. 2, the voltage will be described per one cell for the sake of simple description. To the voltage setting value input Vset of the battery charger 103, a setting voltage Vo of 4.20 V is input from the reference voltage source 123. To the voltage feedback input FB-V of the battery charger 103, an analog feedback voltage Vfb is input from the EC 101. Where there is a difference between the setting voltage Vo and the feedback voltage Vfb, the battery charger 103 is operated to generate an output voltage Vot to cancel the difference, so that the difference becomes zero.

Specifically, when the feedback voltage Vfb is higher than the setting voltage Vo, the battery charger 103 is operated to decrease the output voltage Vot. On the other hand, when the feedback voltage Vfb is lower than the setting voltage Vo, the battery charger 103 is operated to increase the output voltage Vot. In this example of the battery charger 103, when the feedback voltage Vfb is equal to the setting voltage Vo, the output voltage Vot includes an output error e2 of a maximum of ±0.03 V with respect to the setting voltage Vo. Therefore, the battery charger 103 generates several output voltages within the range of 4.17 V to 4.23 V when the feedback voltage Vfb becomes equal to the setting voltage Vo (4.20 V).

It can be assumed that a resistor 104 resulting from wirings, the positive (+) terminal 31, and the negative (−) terminal 35 is connected between the battery charger 103 and the battery cell 11. Therefore, potential difference is generated between the output voltage Vot and the cell voltage Vc depending on the charging current flowing from the battery charger 103 to the battery cell 11. A voltage measurement circuit 51 measures the cell voltage Vc and delivers a reading voltage Vb obtained by converting the measured cell voltage into a digital value to the MPU 23. In this example, the voltage measurement circuit has a reading error e1 of a maximum of ±0.03 V between the cell voltage Vc and the reading voltage Vb. The MPU 23 is provided with an overvoltage protection unit (OVP) 53, which is constructed by a program. In the OVP 53, an overvoltage setting value Vop is set to 4.22 V. When the reading voltage Vb reaches the overvoltage setting value Vop, the MPU 23 turns off the discharging FET 17 and the charging FET 19 via the AFE 21 to thereby stop the charging. Related circuits of the OVP 53 of the MPU 23, the AFE 21, the FETs 17 and 19, and the AFE 21 are collectively referred to as an overvoltage protection circuit.

Since the reading voltage Vb has an error of ±0.03 V with respect to the cell voltage Vc, the cell voltage Vc has several values within the range of 4.19 V to 4.25 V when the OVP 53 set to 4.22 V is operated. The reading voltage Vb is periodically delivered from the MPU 23 to the EC 101. The EC 101 includes a setting unit 55 that stores therein a feedback voltage Vfb. Specifically, the setting unit 55 is a register of the EC 101, and the feedback voltage Vfb set in the setting unit 55 is converted into an analog value and supplied to the voltage feedback input of the battery charger 103. In the setting unit 55, a present feedback voltage V1 that is presently supplied to the battery charger 103 is stored as the feedback voltage Vfb. The EC 101 corrects the present feedback voltage V1 by using the setting voltage Vo and the reading voltage Vb periodically delivered from the MPU 23 to thereby generate a corrected feedback voltage value V2.

The corrected feedback voltage V2 is substituted for the present feedback voltage V1 stored in the setting unit 55 and supplied to the battery charger 103 as the feedback voltage Vfb. The corrected feedback voltage V2 may be calculated by the MPU 23 and supplied to the battery charger 103 via the EC 101. The calculation method of the corrected feedback voltage V2 and the storing of the feedback voltage Vfb in the setting unit 55 will be described later.

Figure 3:
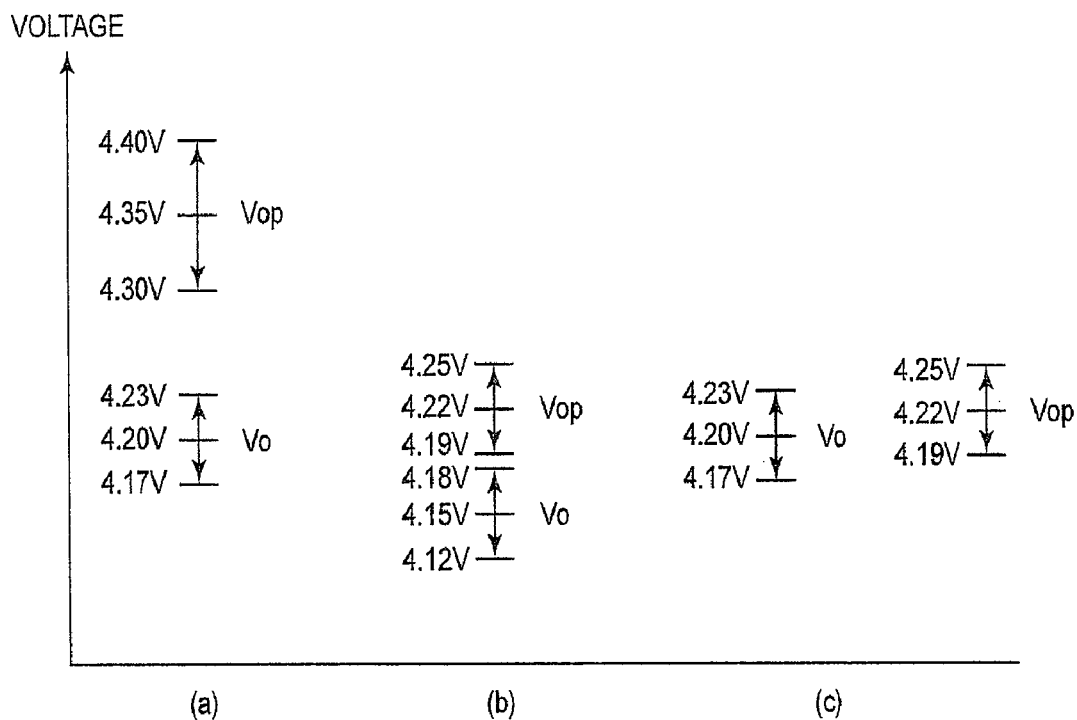
FIG. 3 is a graph illustrating the relationship between a setting voltage of a battery charger and an overvoltage setting value in the voltage feedback system from FIG. 2.

FIG. 3 is a graph illustrating the relationship between the setting voltage Vo of the battery charger 103 and the overvoltage setting value Vop of the OVP 53 in the voltage feedback system of FIG. 2. Specifically, FIG. 3(a) shows the case where a guaranteed value for the overvoltage protection is set to 4.40 V and the feedback voltage Vfb is supplied from the battery charger 103 side. In this case, when the reading voltage Vb has an error of ±5 V and the battery charger has an output error of +0.03 V, the setting voltage Vo can be set to 4.20 V. FIG. 3(b) shows the case where a guaranteed value of the overvoltage protection circuit is set to 4.25 V and the feedback voltage Vfb is supplied from the battery charger 103 side.

Assuming that the overvoltage setting voltage Vop of the OVP 53 which is operated by receiving the reading voltage Vb from the voltage measurement circuit with a reading error of ±0.03 V is set to 4.22 V, and the battery charger has an output error of ±0.03 V, in order to prevent activation of the OVP 53 during a normal charging operation while providing a guaranteed value of 4.25 V for the overvoltage protection, it is necessary to set the setting voltage Vo of the battery charger to 4.15 V, which is by 0.05 V lower than the setting voltage Vo when the guaranteed value for the overvoltage protection is 4.40 V.

However, decreasing the setting voltage Vo may lead to decrease in the full charge capacity and increase in the charging time, which is therefore not desirable. In the present embodiment, even when the guaranteed value for the overvoltage protection is set to 4.25 V, the malfunctioning of the OVP 53 can be prevented while the setting voltage Vo of the battery charger is set to 4.20 V similar to the conventional case. FIG. 3(c) shows the relationship between the setting voltage Vo and the overvoltage setting value Vop according to the present embodiment. In this example, the overvoltage setting value Vop is set to 4.22 V, and the setting voltage Vo is set to 4.20 V. There is an overlapping portion between the range (4.17 V to 4.23 V) of the cell voltage Vc and the range (4.19 V to 4.25 V) of the output voltage Vot when the OVP 53 is in operation. Therefore, when the charging current is small, the cell voltage Vc approaches the output voltage Vot. However, in the charging system of the present invention, the malfunctioning of the OVP 53 is prevented by a control method described later.

Figure 4:
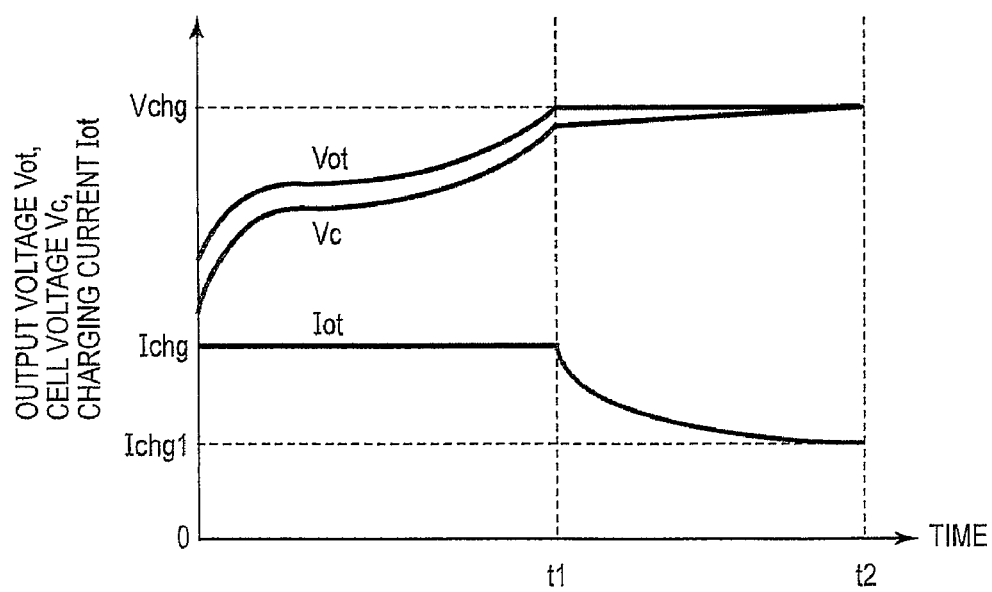
FIG. 4 is a graph for explaining change with time of a charging voltage and a charging current output from a battery charger after the start of charging.

FIG. 4 is a graph for explaining change with time of the output voltage Vot and the charging current Iot output from the battery charger 103 after the start of charging. The battery charger 103 charges the battery cells 11 to 13 by a constant-current/constant-voltage method, and a charging control voltage Vchg corresponds to the setting voltage Vo of the battery charger 103. When the charging is started at time 0, the F battery charger 103 operates the FET 105 and the FET 107 to thereby control the output voltage Vot so that the charging current Iot becomes the charging control current Ichg. Since a resistor is present between the output voltage Vot of the battery charger 103 and the battery cells 11 to 13, the cell voltage Vc has a value lower than that of the output voltage Vot.

The period between the charging start time and time t1 corresponds to a constant current control period, and the period between time t1 and time t2 corresponds to a constant voltage control period. When the feedback voltage Vfb supplied to the battery charger 103 becomes equal to the setting voltage Vo, the battery charger 103 enters the constant voltage control period and operates the FET 105 and the FET 107 to thereby control the output voltage Vot so that the feedback voltage Vfb becomes equal to the setting voltage Vo. At a time at which the charging current Iot reaches a discharge termination current Ichg1 during the constant voltage control period, the charging is terminated. At a time the charging is terminated, the cell voltage Vc becomes substantially equal to the output voltage Vot. The amount of electricity charged during a period between time t0 and time t2 becomes the full charge capacity of the battery cells 11 to 13. Therefore, the full charge capacity increases when the charging control voltage Vchg is set as high as possible within an allowable range.

FIG. 5 is a chart for explaining the operation of the voltage feedback control system shown in FIG. 3. The voltage measurement circuit 51 has a reading error e1 of a maximum of ±0.03 V, and the battery charger 103 has an output error e2 of a maximum of ±0.03 V. When constructing a charging system, usually, since the voltage measurement circuit 51 and the battery charger 103 can be arbitrarily combined, the reading error e1 and the output error e2 are also arbitrarily combined. For the four combinations of the errors composed of the respective maximum errors, the operations of the voltage feedback control system when the setting voltage Vo is set to 4.20 V and the overvoltage setting value Vop is set to 4.22 V, as shown in FIG. 3(c), will be described.

In the control system corresponding to states #1 to #5, the voltage measurement circuit 51 has a reading error e1 of −0.03 V, and the battery charger 103 has an output error e2 of +0.03 V. The reading voltage Vb, the corrected feedback voltage value V2, a target output voltage value Vt of the battery charger 103, and an actual output voltage value Vot of the battery charger 103 are calculated by the following formulas (1) to (5), respectively. In addition, since the charging current is small in the constant voltage control period, a voltage drop by the resistor 104 will be neglected for the sake of simple calculation. The target output voltage Vt is a voltage which the battery charger outputs based on the setting voltage Vo and the feedback voltage Vfb when it is assumed that the battery charger 103 does not have the output error e2. In the formula, a is a weight factor used in calculating the corrected feedback voltage V2 to perform feedback control of the output voltage of the battery charger 103 so that the malfunctioning of the OVP 53 is prevented.

$$Vb = Vc + e1 \quad (1)$$

$$V2 = V1 + (Vb - Vo) \quad (2)$$

$$V2 = V1 + (Vb - Vo)*\alpha \quad (3)$$

$$Vt = Vo + (Vo - Vfb) \quad (4)$$

$$Vot = Vt + e2 \quad (5)$$

During the constant current control period, the setting voltage Vo (4.20 V) is set as a present feedback voltage V1 in the setting unit 55 of the EC 101 and is output as a feedback voltage Vfb to the battery charger 103. The setting voltage Vo corresponds to the rated voltage of the battery charger 103. However, during the constant current control period, since the battery charger 103 is operated so that the charging current Iot becomes equal to the charging control current value Ichg, the voltage feedback is not performed. As shown in the state #1, when the cell voltage Vc increases up to 4.23 V and the reading voltage Vb becomes equal to the feedback voltage Vfb (4.20 V), the battery charger 103 enters the constant voltage control period and is operated to generate a target output voltage Vt for canceling the difference between the feedback voltage Vfb and the setting voltage Vo as specified by formula (4). In this control system, as calculated by formulas (4) and (5), when the feedback voltage Vfb is 4.20 V, the output voltage Vot and the cell voltage Vc become 4.23 V and thus it becomes stable. At that instant, since the reading voltage Vb is lower than the overvoltage setting voltage Vop (4.22 V), the OVP 53 is not operated.

In the state #1, it becomes stable because the output voltage Vot is 4.23 V when the cell voltage Vc is 4.23 V. However, as shown in the state #2, the cell voltage Vc may decrease to 4.22 V due to the drift of the battery charger 103 or a change in ambient temperature. Then, the EC 101 detects such a state by detecting the reading voltage Vb decreased to 4.19 V, substitutes the present feedback voltage V1 (4.20 V) stored in the setting unit 55 with a corrected feedback voltage V2 (4.19 V) calculated by formula (2), and supplies the corrected feedback voltage V2 to the voltage setting value input Vset of the battery charger. Then, the battery charger 103 is operated to generate the target output voltage Vt of 4.21 V as specified by formula (4). However, actually, since the battery charger 103 has the output error e2, the output voltage Vot becomes 4.24 V as calculated by formula (5) and thus the cell voltage Vc increases.

In the drawing, #3 shows the state where the cell voltage Vc is decreased to 4.21 V from the state #1. In this state, similar to the state #2, the EC 101 calculates the corrected feedback voltage V2 to thereby determine the output voltage Vot. Also, #4 shows the state where the cell voltage Vc is changed to 4.24 V. In this case, the reading voltage Vb becomes 4.21 V, which approaches the overvoltage setting value Vop (4.22 V) but has not reached it; therefore, the EC 101 calculates the corrected feedback voltage V2 by formula (3) and outputs the calculated voltage as the feedback voltage Vfb to the battery charger 103. In formula (3), the battery charger 103 applies a weight factor a (1.2) to the value, Vb−Vo, which is used for correcting the output voltage Vot for the setting voltage value Vo, to thereby increase the feedback effect.

As a result, the output voltage Vot of the battery charger becomes 4.218 V and the cell voltage Vc decreases toward 4.218 V. When the feedback voltage Vfb is calculated by formula (2), the output voltage Vot becomes 4.22 V and the cell voltage Vc can be decreased toward 4.22 V. However, by using formula (3), the voltage can be decreased in a shorter time; therefore, it is possible to more securely prevent the malfunctioning of the OVP 53 for a case where the cell voltage Vc is increasing aggressively. In the drawing, #5 shows the state where the cell voltage Vc is decreased to 4.20 V from the state #4. In the setting unit 55, the corrected feedback voltage V2 (4.212 V) calculated in the state #4 is stored as a present feedback voltage V1. Then, the EC 101 calculates the corrected feedback voltage V2 by formula (2) and delivers the calculated voltage V2 as the feedback voltage value Vfb to the battery charger 103. Then, the output voltage Vot of the battery charger 103 becomes 4.248 V and the cell voltage Vc is increased.

Next, the control system corresponding to states #6 to #9 will be described. In this control system, the voltage measurement circuit 51 has a reading error e1 of +0.03 V, and the battery charger 103 has an output error e2 of −0.03 V. This control system enters the constant voltage control period when the reading voltage Vb becomes 4.2 V at the cell voltage Vc of 4.17 V, and the battery charger 103 becomes stable with the output voltage Vot at 4.17 V. In states #7 and #8, the corrected feedback voltage V2 at a time the cell voltage Vc is changed from the state #6 is calculated by the EC 101 from formula (2), and the output voltage Vot calculated by formulas (4) and (5) is shown. In the state #9, the cell voltage Vc is changed to 4.18 V from the state #6 and the reading voltage Vb reaches 4.21 V; therefore, the EC 101 calculates the corrected feedback voltage V2 (4.212 V) by using formula (3) to thereby supply the calculated voltage V2 as the feedback voltage Vfb to the battery charger 103. Then, the battery charger 103 decreases the output voltage Vot to 4.158 V as calculated by formulas (4) and (5) to thereby decrease the cell voltage Vc.

Next, the control system corresponding to states #10 to #15 will be described. In this control system, the voltage measurement circuit 51 has a reading error e1 of −0.03 V, and the battery charger 103 has an output error e2 of −0.03 V. As shown in the state #10, in this control system, during the constant current control period in which the present feedback voltage V1 is set to the setting voltage Vo (4.2 V), the cell voltage Vc and the output voltage Vot become 4.17 V. However, since the reading voltage Vb (4.14 V) have not reached the setting voltage Vo (4.20 V); therefore, the constant current control is continued, and as shown in the state #11, the cell voltage V2 increases until the reading voltage Vb reaches 4.23 V. At that instant, since the reading voltage Vb becomes equal to the setting voltage Vo, the battery charger 103 enters the constant voltage control period.

When it enters the constant voltage period in the state #11, since the cell voltage Vc reaches 4.23 V but the output voltage Vot decreases to 4.17 V, the battery charger 103 is operated and stabilized by decreasing the cell voltage Vc so that the cell voltage Vc and the output voltage Vot becomes 4.20 V when the corrected feedback voltage V2 becomes 4.17 V as shown in the state #14. In the state #14, the present feedback voltage V1 is 4.2 V and the cell voltage Vc is shown as if it is changed from the state #10 to the state #14. However, actually, the cell voltage Vc experiences various changes: specifically, the corrected feedback voltage V2 is calculated every time and the output voltage Vot is subjected to feedback control, whereby the respective values converge to the relationships shown in the state #14 including the cell voltage Vc (4.20 V), the reading voltage Vb (4.17 V), the corrected feedback voltage V2 (4.17 V), and the output voltage Vot (4.20 V).

In this control system, since the reading voltage Vb at a stable state is 4.17 V, which is sufficiently lower than the overvoltage setting value Vop (4.22 V) and actually the reading voltage Vb reaches 4.21 V, it is not necessary to calculate the corrected feedback voltage by formula (3). However, if such changes occur due to some reasons, the corrected feedback voltage V2 may be calculated by formula (3).

Next, the control system corresponding to states #16 to #20 will be described. In this control system, the voltage measurement circuit 51 has a reading error e1 of +0.03 V, and the battery charger 103 has an output error e2 of +0.03 V. As shown in the state #16, this control system enters the constant voltage control period when the reading voltage Vb reaches 4.20 V at the cell voltage Vc of 4.17 V. However, at that instant, since the output voltage Vot of the battery charger is 4.23 V, the cell voltage Vc increases further. As shown in the state #19, the battery charger 103 is operated and stabilized so that the cell voltage Vc and the output voltage Vot become 4.20 V when the corrected feedback voltage V2 is 4.23 V. However, since the reading voltage Vb already exceeds the overvoltage setting value Vop (4.22 V) when the cell voltage Vc is 4.20 V, this control system cannot operate at such a state.

In this control system, as shown in the state #20, when the cell voltage Vc reaches 4.18 V and the reading voltage Vb becomes 4.21 V, the corrected feedback voltage V2 is calculated by formula (3), and the output voltage Vot is decreased to 4.218 V which is lower than the output voltage Vot (4.22 V) calculated in the state #17 at the same reading voltage Vb, whereby activation of the OVP 53 can be prevented.

In the four charging systems shown in FIG. 2, the actually stabilized output voltage Vot differs depending on the size and combination of the reading error e1 and the output error e2; however, the rated voltage Vo can be set to 4.20 V in any cases. In the present embodiment, when the voltage measured by the voltage measurement circuit 51 of the battery pack approaches the operation value of the OVP 53, the EC 101 corrects the feedback voltage Vfb to thereby decrease the output voltage Vot. Therefore, it is possible to charge the battery cell with the maximum output voltage Vot that is allowed in the charging system by the reading error e1 and the output error e2. In the example of FIG. 5, among the charging systems in which the voltage measurement circuit has a reading error e1 of a maximum of ±0.03 V and the battery charger has an output error e2 of maximum of ±0.03 V, the charging system corresponding to the states #1 to #5 outputs the highest cell voltage, while the charging system corresponding to the states #6 to #9 outputs the lowest cell voltage. In any of the charging systems, the OVP 53 can have a guaranteed value of 4.25 V with the setting voltage Vo set to 4.20 V.

The charging system shown in FIG. 2 provides an additional effect that a required charging time is decreased. The measurement value of the feedback voltage Vfb supplied to the voltage feedback input FB-V of the battery charger 103 may be slightly higher when it is measured at the battery pack side than when measured at the portable computer 10 side since the voltage may drop resulting from the resistor 104 due to many electronic components, wirings, and connectors present between them. For this reason, assuming that the battery charger 103 enters the constant voltage control period from the constant current control period when the reading voltage Vb reaches the setting voltage Vo, the battery charger may enter the constant voltage control period earlier when the feedback voltage Vfb is measured at the portable computer side in the conventional manner than when measured at the battery pack side. This means that the period in which the charging is performed by the constant current control is decreased, and therefore, the charging time to the full charge capacity is increased. In this respect, the charging system according to the present embodiment can shorten the charging time more than the conventional method.

Figure 6:
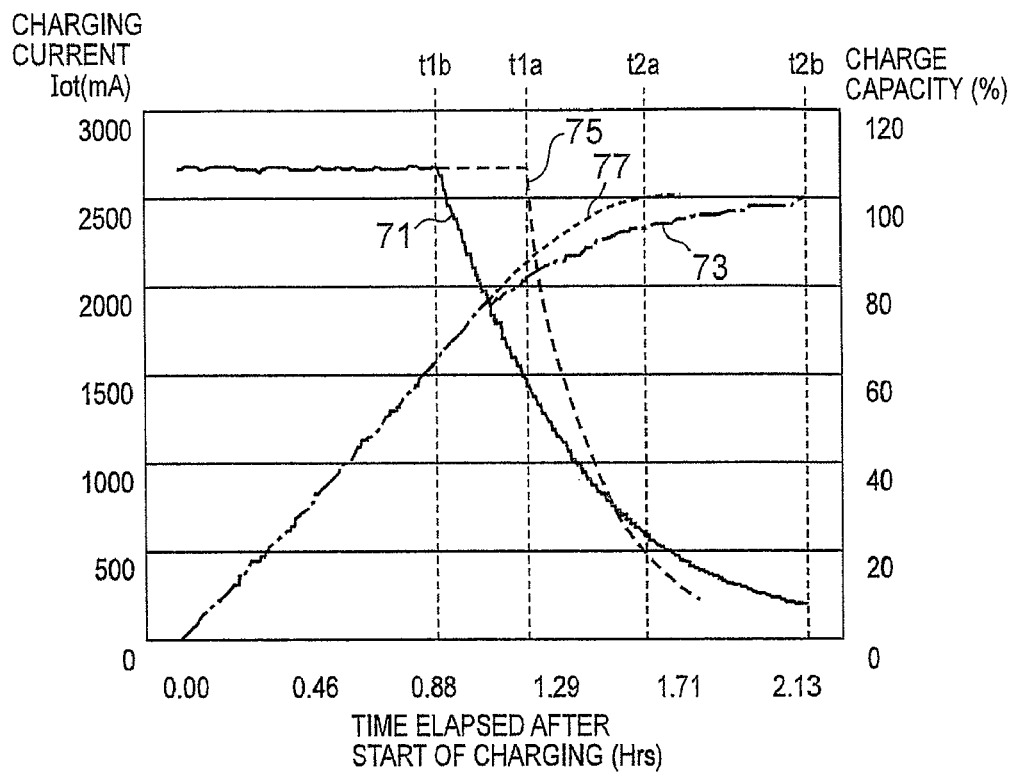
FIG. 6 is a graph illustrating a required charging time.

FIG. 6 shows experiment results on the required charging time for the conventional method and the charging system according to the present embodiment. In the drawing, lines 71 and 73 respectively show the charging current and charge capacity when the battery cells are charged by the conventional charging system shown in FIG. 3(a); and lines 75 and 77 respectively show the charging current and charge capacity when the battery cells are charged by the charging system shown in FIG. 2. As shown by the line 71, in the conventional method, the battery charger 103 enters at time t1b the constant voltage control period from the constant current control period and reaches the full charge capacity at time t2b as shown by the line 73. In contrast, in the method of the present embodiment, as shown by the line 75, the battery charger 103 enters at time t1a later than time t1b the constant voltage control period from the constant current control period and reaches the full charge capacity at time t2a earlier than time t2b as shown by the line 77. Therefore, the charging system of FIG. 2 can shorten the required time to the full charge capacity by about 20 minutes compared with the conventional method.

Figure 7:
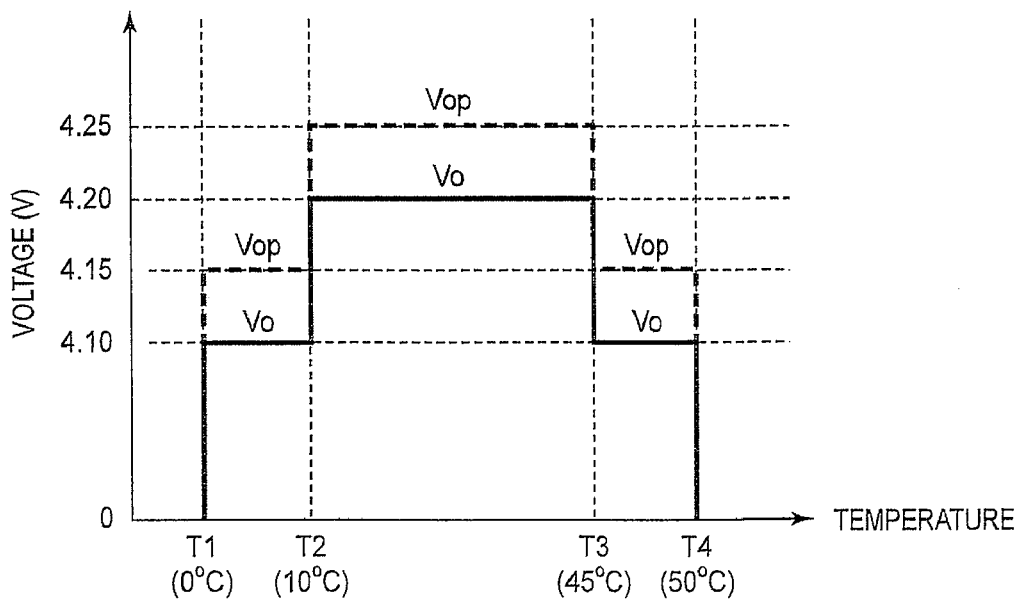
FIG. 7 is a graph illustrating the relationship between a setting voltage or an overvoltage setting value and a use temperature range of a lithium ion battery.

FIG. 7 is a diagram illustrating the relationship between the setting voltage and the overvoltage setting value and a use temperature range according to the safety standards of a lithium ion rechargeable battery suggested by Battery Association of Japan (BAJ) and Japan Electronics and Information Technology Industries Association (JEITA). It is considered that a temperature range from T2 to T3 (10° C. to 45° C.) is a standard temperature range, where the lithium ion rechargeable battery can safely exhibit the best performance. The setting voltage Vo (4.20 V) and the overvoltage setting value Vop (4.25 V) are based on the charging condition at the standard temperature range.

When the lithium ion rechargeable battery is used at temperatures outside the standard temperature range, it is considered from the perspective of safety that it is preferable to charge with a charging voltage lower than that in the standard temperature range. Specifically, a temperature range from T1 to T2 (0° C. to 10° C.) is considered as a low temperature range while a temperature range from T3 to T4 (45° C. to 50° C.) is considered as a high temperature range. In the low and high temperature ranges, it is suggested that the setting voltage Vo is set to 4.10 V and the overvoltage setting value Vop is set to 4.15 V. In a temperature range of no more than 0° C. and no less than 50° C. outside the standard, low, and high temperature ranges, the lithium ion rechargeable battery is prohibited from charging. In the present invention, the respective temperature values T1 to T4 and the setting voltage Vo and the overvoltage setting value Vop at the respective temperature ranges are not construed as a limiting sense but other values may be substituted when they are suggested.

In the charging system according to the present embodiment, the setting voltage Vo and the overvoltage setting value Vop can be changed in accordance with temperature of the environment in which the battery pack 10 is used. In FIG. 7, the solid line indicates the setting voltage Vo, and the dotted line indicates the overvoltage setting value Vop. In accordance with the ambient temperature, the EC 101 changes the output of the reference voltage source 123 to thereby change the setting voltage Vo of the voltage setting value input Vset, while the MPU 23 changes the overvoltage setting value Vop by a program.

The EC 101 detects the ambient temperature of the battery cells 11 to 13 by the thermistor 27 disposed inside the battery pack 10 and adjacent to the battery cells 11 to 13. When it is determined by the EC 101 that the temperature detected by the thermistor 27 belongs to the high or low temperature range, the EC 101 first changes the output of the reference voltage source 123 to thereby change the setting voltage Vo of the voltage setting value input Vset. Next, the EC 101 changes the present feedback voltage V1 stored in the setting unit 55 to the changed setting voltage Vo to thereby decrease a voltage at which the constant current control period is switched to the constant voltage control period. Upon receipt of the temperature from the EC 101, the MPU 103 changes the overvoltage setting value Vop to a value corresponding to the changed setting value Vo. As shown in FIG. 7, in the standard temperature range, Vop is set to 4.25 V and Vo is set to 4.20 V, while in the low and high temperature ranges, Vop is set to 4.15 V and Vo is set to 4.10 V.

To charge the lithium ion battery charger, it is necessary to manage the charging control voltage Vchg with high precision; however, the charging control current Ichg does not need to be controlled with such high precision as the charging control voltage Vchg, and the charging control current Ichg may have substantially the same value whether it is measured at the portable computer 100 side or at the battery pack 10 side. Therefore, although FIG. 1 shows the voltage feedback input Vset and the current feedback input Iset both being supplied from the battery pack 10, the charging current Iot to the current feedback input Iset may be fed back to the battery charger 103 from a sensor resistor provided at the portable computer 100 side as in the conventional manner.

Figure 8:
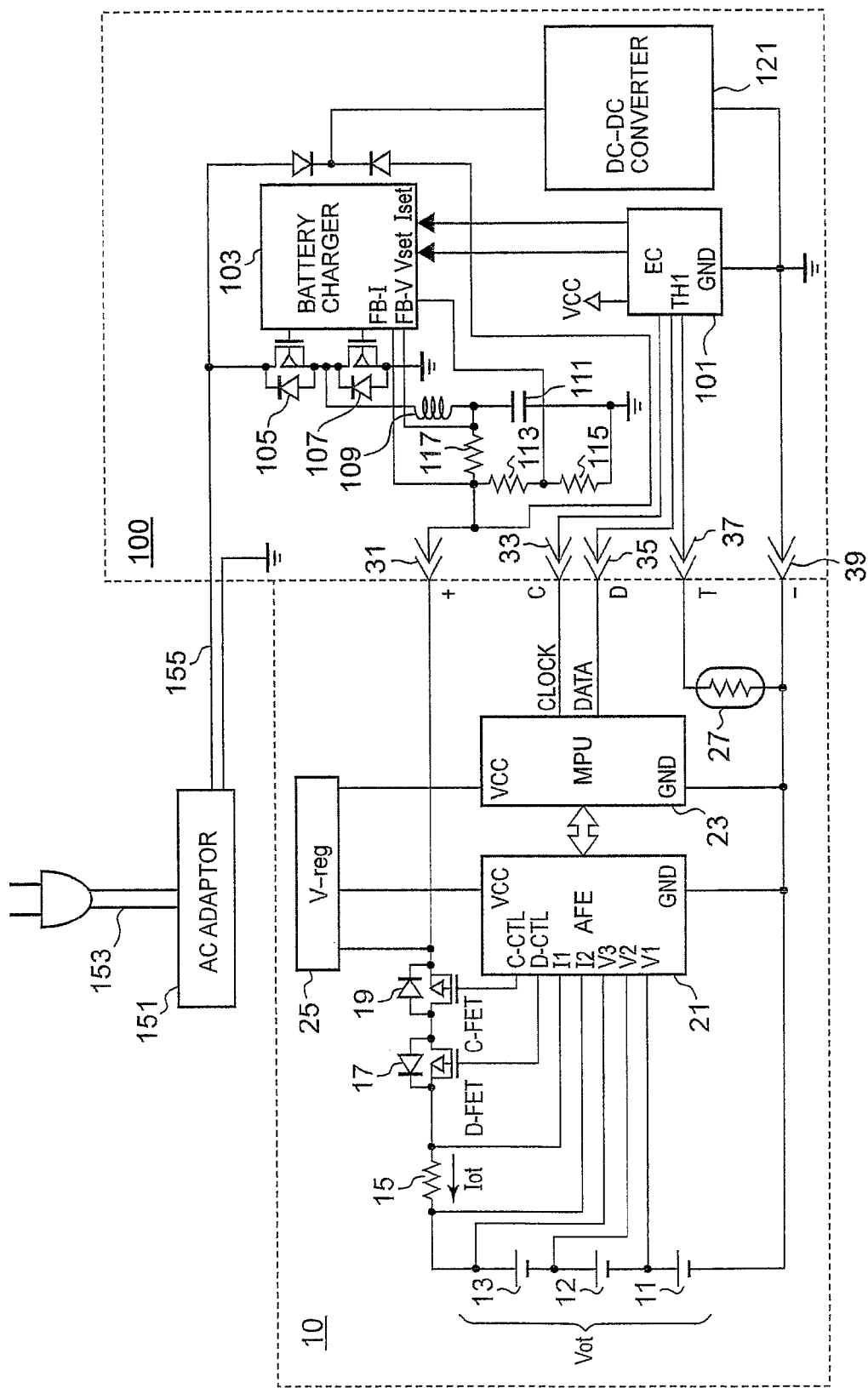
FIG. 8 is a schematic diagram of a charging system having a battery pack, in accordance with an alternative embodiment of the present invention.
Figure 9:
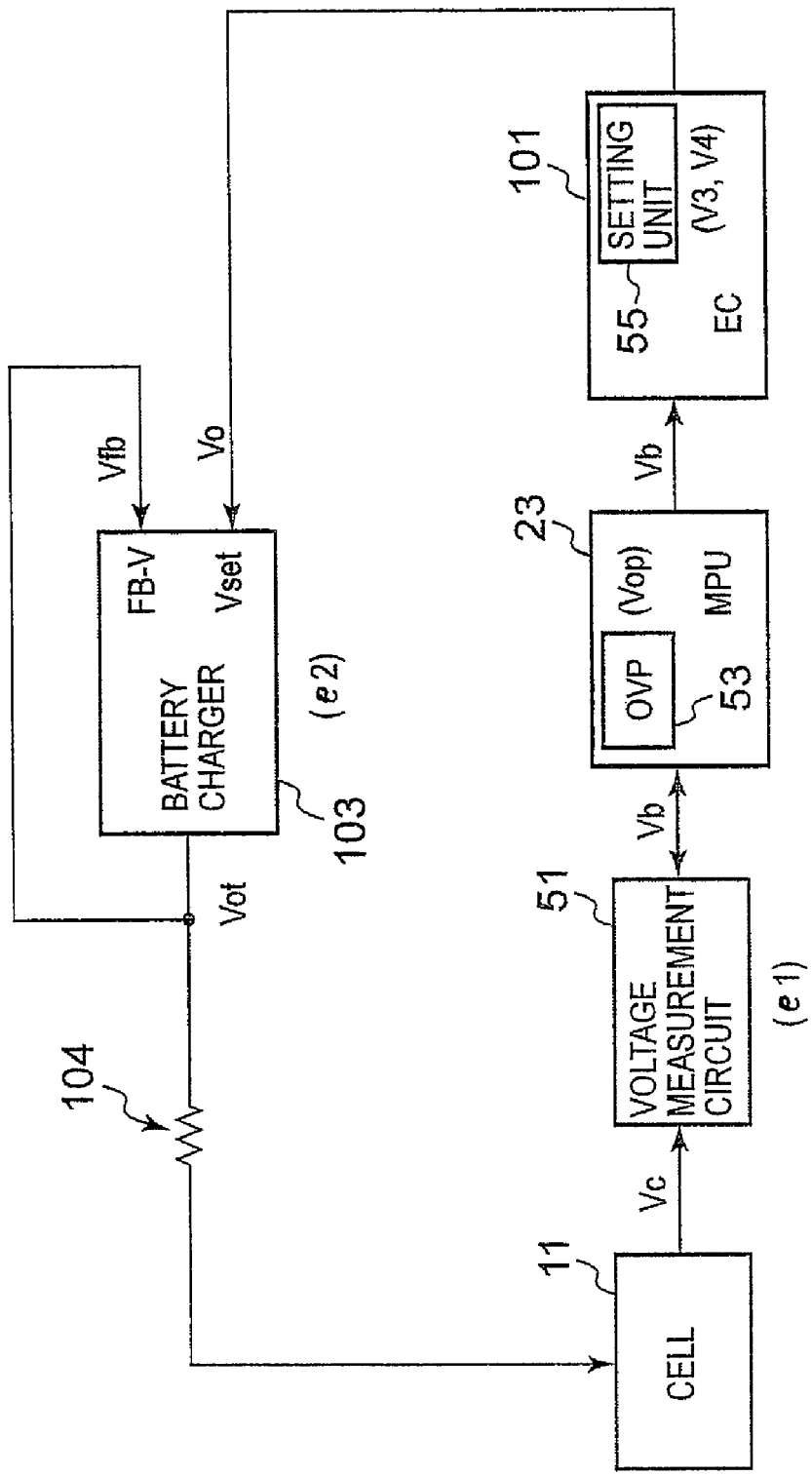
FIG. 9 is a block diagram of a voltage feedback system of the charging system from FIG. 8.

FIG. 8 is a schematic diagram of a battery pack 10 in compliance with the SBS standards along with a portable computer 100, in accordance with an alternative embodiment of the present invention. FIG. 9 is a block diagram for explaining in detail a voltage feedback system of the charging system of FIG. 8. In FIGS. 8 and 9, the same components as FIG. 1 will be referenced by the same reference numerals, and thus redundant description thereof will be omitted. In this charging system, the EC 101 delivers the charging current and the reading voltage Vb received from the battery pack 10 to the current setting value input Iset and the voltage setting value input Vset of the battery charger 103. To the voltage feedback input FB-V and the current feedback input FB-I of the battery charger 103, dividing resistors 113 and 115 provided at the PC side and an output from the sensor resistor 117 are connected respectively. To the voltage feedback input FB-V, the feedback voltage Vfb is input.

In this charging system, a present setting voltage V3 or a corrected setting voltage V4 is stored in the setting unit 55 of the EC 101. The corrected setting voltage V4 is calculated by the EC 101 from a formula corresponding to formulas (2) and (3). Once the corrected setting value V4 is stored in the setting unit 55, the value V4 serves as the present setting value V3, and the present setting value V3 is supplied as the setting value Vo from the setting unit 55 to the voltage setting value input Vset of the battery charger 103. In the constant current control period, it is set such that the present setting value V3 becomes 4.20 V, which is the rated voltage, and the battery charger 103 enters the constant voltage control period when the feedback voltage Vfb reaches 4.20 V. In the constant voltage control period, the battery charger 103 is operated such that the value of the feedback voltage Vfb becomes equal to the value of the setting value Vo.

Contrary to the charging system of FIG. 2, when the reading voltage Vb increases, the EC 101 corrects the corrected setting voltage V2 so as to increase to thereby decrease the output voltage Vot. On the other hand, when the reading voltage Vb decreases, the EC 101 corrects the corrected setting voltage V2 so as to decrease to thereby increase the output voltage Vot. When the reading voltage Vb has approached the overvoltage setting value Vop, the EC 101 delivers to the battery charger 103 the corrected setting value V4 obtained by correcting the present setting value V3 by using a formula corresponding to formula (3) using a weight factor to thereby prevent malfunctioning of the OVP 53.

As has been described, the present invention provides a charging system that can maintain a high-setting voltage of a battery charger while maintaining a low-setting value of an overvoltage protection circuit with respect to a battery cell.

While the invention has been particularly shown and described with reference to a preferred embodiment, it will be understood by those skilled in the art that various changes in form and detail may be made therein without departing from the spirit and scope of the invention.

What is claimed is:

1. A charging system comprising:
a battery cell;
a voltage measurement circuit for measuring a cell voltage of said battery cell;
a battery charger for charging said battery cell, wherein said battery charger includes a voltage feedback input for receiving a feedback voltage and a setting value input for receiving a setting voltage;
a control unit for supplying said feedback voltage to said battery charger to perform feedback control of an output voltage of said battery charger, wherein said feedback voltage is generated based on a reading voltage measured by said voltage measurement circuit and said setting voltage;
and an overvoltage protection circuit for stopping charging said battery cell when said reading voltage measured by said voltage measurement circuit reaches an overvoltage setting value.

2. The charging system of claim 1, wherein said battery charger performs feedback control of said output voltage based on said control voltage in a constant-voltage control period.

3. The charging system of claim 2, wherein said control unit supplies a corrected control voltage that is obtained by correcting a present value of said feedback voltage using said reading voltage and said setting voltage as a new present value of said feedback voltage, to said battery charger during said constant-voltage control period.

4. The charging system of claim 2, wherein said control unit supplies a rated voltage of said battery charger as said feedback voltage to said battery charger during said constant-current control period.

5. The charging system of claim 3, wherein said control unit generates said corrected control voltage so that said output voltage is further lowered compared with a case when said reading voltage does not approach said overvoltage setting value when said reading voltage approaches said overvoltage setting value.

6. The charging system of claim 2, wherein said setting voltage and said overvoltage setting value are set so an output error range of said output voltage with respect to said setting voltage overlaps an error range of said reading voltage corresponding to said overvoltage setting value to said cell voltage.

7. A charging system comprising:
a battery pack having a battery cell;
a voltage measurement circuit for measuring a cell voltage of said battery cell; and
a processor including an overvoltage protection unit for stopping charging to said battery cell when a reading voltage measured by said voltage measurement circuit reaches an overvoltage setting value; and an electronic device with which said battery pack is associated,
wherein said electronic device includes a battery charger for charging said battery cell, wherein said battery charger including a voltage feedback input for receiving a feedback voltage and a setting value input for receiving a setting voltage;
and a controller for supplying said feedback voltage generated based on said setting voltage and said reading voltage received from said battery pack to said battery charger to perform feedback control of an output voltage of said battery charger.

8. The charging system of claim 7, wherein said battery pack includes a temperature element that measures internal temperature of said battery pack, and said setting voltage is changed based on the temperature measured by said temperature element.

9. The charging system of claim 7, wherein said processor is capable of generating a control voltage based on a reading voltage measured by said voltage measurement circuit, wherein said processor includes an overvoltage protection unit for stopping charging to said battery cell when said reading voltage measured by said voltage measurement circuit reaches an overvoltage setting value.

* * * * *